(12) United States Patent
Smith (10) Patent No.: US 10,730,457 B1
(45) Date of Patent: Aug. 4, 2020

(54) METHOD AND APPARATUS FOR PRESENTING INFORMATION ON A VEHICLE DISPLAY

(71) Applicant: GM GLOBAL TECHNOLOGY OPERATIONS LLC, Detroit, MI (US)

(72) Inventor: Dustin H. Smith, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/541,646

(22) Filed: Aug. 15, 2019

(51) Int. Cl.
| | |
|---|---|
| *G08G 1/09* | (2006.01) |
| *B60R 16/023* | (2006.01) |
| *B60K 37/02* | (2006.01) |
| *G06F 9/451* | (2018.01) |
| *G01D 7/00* | (2006.01) |
| *G08G 1/0967* | (2006.01) |

(52) U.S. Cl.
CPC .......... *B60R 16/0232* (2013.01); *B60K 37/02* (2013.01); *G01D 7/00* (2013.01); *G06F 9/451* (2018.02); *G08G 1/096725* (2013.01); *B60R 2300/207* (2013.01)

(58) Field of Classification Search
CPC ................................................. B60Q 16/0232
USPC .................. 340/905, 907, 929, 936, 995.13; 701/202, 301, 527
See application file for complete search history.

(56) References Cited

U.S. PATENT DOCUMENTS

| | | | |
|---|---|---|---|
| 2007/0152844 A1* | 7/2007 | Hartley | G08G 1/0104 340/905 |
| 2007/0257817 A1* | 11/2007 | Mahoney | G09F 9/30 340/929 |
| 2011/0093178 A1* | 4/2011 | Yamada | G08G 1/096716 701/70 |
| 2013/0110316 A1* | 5/2013 | Ogawa | G08G 1/09623 701/1 |

* cited by examiner

*Primary Examiner* — Tai T Nguyen
(74) *Attorney, Agent, or Firm* — Lorenz & Kopf, LLP (57) ABSTRACT

Methods and apparatus are provided for providing a user notification operative for establishing a connection to a mobile device, receiving a notification from the mobile device, receiving an indication of a red-light state and a time remaining of the red-light state via a wireless communications, detecting a stationary vehicle condition from a vehicle controller, displaying the notification, the indication of the red-light state and the time remaining of the red-light state to a vehicle operator on a video display in response to the stationary vehicle condition, and discontinuing display of the notification in response to at least one of an indication of a vehicle movement from a vehicle controller and the time remaining of the red-light state being zero seconds.

20 Claims, 5 Drawing Sheets

MÉTHOD AND APPARATUS FOR
PRESENTING INFORMATION ON A
VEHICLE DISPLAY

INTRODUCTION

The present disclosure relates generally to a system for configuring a user interface in a motor vehicle. More specifically, aspects of the present disclosure relate to systems, methods and devices for consolidating received information during vehicle operation and presenting digests of the information to a vehicle operator on a video display when the vehicle is stopped.

Text messages and other mobile phone application notifications are distracting to drivers and require the driver to look away from the road to receive and acknowledge the messages. It would be desirable to provide important information to drivers concerning these messages in a safe and non-distracting manner in order to overcome the aforementioned problems.

The above information disclosed in this background section is only for enhancement of understanding of the background of the invention and therefore it may contain information that does not form the prior art that is already known to a person of ordinary skill in the art.

SUMMARY

Disclosed herein are human machine interface methods and systems and related control logic for provisioning computational systems, methods for making and methods for operating such systems, and motor vehicles equipped with onboard control systems. By way of example, and not limitation, there is presented various embodiments of presentation of information on a display in a motor vehicle during vehicle operation are disclosed herein.

In accordance with an aspect of the present invention an apparatus including a vehicle controller for providing an indication of a vehicle a being stationary and an indication of the vehicle being in motion, a receiver operative to receive a communication indicative of a red-light traffic light state and a time indication of a time remaining in the red-light traffic light state, a processor operative to generate a graphical user interface, wherein the graphical user interface includes a notification and a time remaining in the red-light traffic state, and a display for displaying the graphical user interface in response to the indication of the vehicle being stationary and the time remaining in the red-light traffic state being greater than zero seconds, wherein the display is further operate to cease displaying the graphical user interface in response to at least one of the indication of the vehicle being in motion and the time remaining in the red-light traffic state being less than zero seconds.

In accordance with another aspect of the present invention including an input for receiving the notification from a mobile device.

In accordance with another aspect of the present invention wherein the notification is received from the vehicle controller.

In accordance with another aspect of the present invention wherein the receiver is a vehicle to infrastructure communications device.

In accordance with another aspect of the present invention further including a user input wherein the user input is operative to receive a user response to the notification.

In accordance with another aspect of the present invention wherein the display is a touch sensitive display and is further operative to receive a user response to the notification.

In accordance with another aspect of the present invention wherein the communication indicative of the red-light state is received from a traffic signal controller via a vehicle to infrastructure communications network.

In accordance with another aspect of the present invention including a memory for storing the notification in response to at least one of the indication of the vehicle being in motion and the time remaining in the red-light traffic state being less than zero seconds.

In accordance with another aspect of the present invention, a method including establishing a connection to a mobile device, receiving a notification from the mobile device, receiving an indication of a red-light state and a time remaining of the red-light state via a wireless communications, detecting a stationary vehicle condition from a vehicle controller, displaying the notification, the indication of the red-light state and the time remaining of the red-light state to a vehicle operator on a video display in response to the stationary vehicle condition, discontinuing display of the notification in response to at least one of an indication of a vehicle movement from a vehicle controller and the time remaining of the red-light state being zero seconds.

In accordance with another aspect of the present invention wherein the connection to the mobile device is a wireless connection.

In accordance with another aspect of the present invention wherein the indication of the red-light state and the time remaining of the red-light state are received from a traffic light controller via a vehicle to infrastructure communications network.

In accordance with another aspect of the present invention wherein the display is further operative to generate a prioritized list of a notification from the mobile device and a message from the vehicle controller.

In accordance with another aspect of the present invention wherein the notification is indicative of a missed call and wherein the notification is further indicative of a telephone number associated with the missed call.

In accordance with another aspect of the present invention operative to receive a user input indicative of a response to the notification and to initiate a telephone call in response to the user input and a telephone number associated with the notification.

In accordance with another aspect of the present invention including display a suggested response to the notification and a user input for selecting the suggested response.

In accordance with another aspect of the present invention storing the notification in a memory in response to discontinuing display of the notification.

In accordance with another aspect of the present invention including receiving an indicator from the vehicle controller and a weather alert and generating a prioritized list in response to the notification, weather alert, and the indicator and displaying the prioritized list in response to the stationary vehicle condition.

In accordance with another aspect of the present invention, a vehicle operator notification system comprising a first receiver operative to receive a first notification and a second notification, a second receiver to receive a traffic light state and a traffic light state duration, a processor operative to generate a prioritized digest of the first notification and the second notification, the processor being further operative to couple the prioritized digest to a display in response to the traffic light state being red and the traffic light state duration being greater than zero seconds, and a display operative to display the prioritized digest to a vehicle operator.

In accordance with another aspect of the present invention wherein the first notification and the second notification are received from a mobile device via a wireless network.

In accordance with another aspect of the present invention wherein the traffic light state and the traffic light state duration are received via a vehicle to infrastructure communications network.

The above advantage and other advantages and features of the present disclosure will be apparent from the following detailed description of the preferred embodiments when taken in connection with the accompanying drawings.

BRIEF DESCRIPTION OF THE DRAWINGS

The exemplary embodiments will hereinafter be described in conjunction with the following drawing figures, wherein like numerals denote like elements, and wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
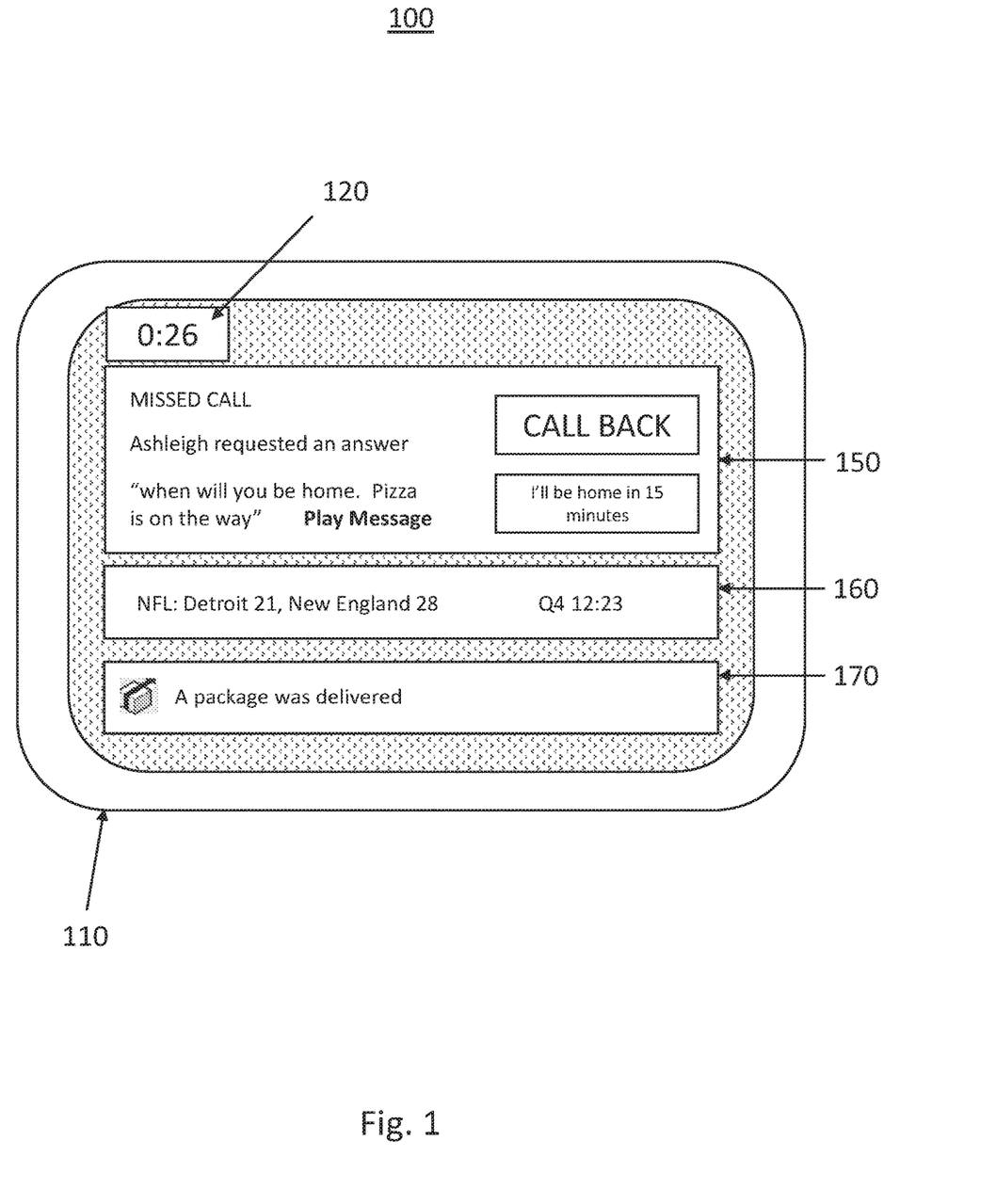
FIG. 1 shows an application for the method and apparatus for location and calibration for controls on a user interface according to an exemplary embodiment of the present disclosure.

Turning now to FIG. 1, an environment for a system 100 for location and calibration for controls on a user interface according to an exemplary embodiment of the present disclosure is shown. The exemplary environment 100 may include a graphical display 110, wherein the graphical display 110 may be a liquid crystal display (LCD), light emitting diode (LED) based graphical display or an organic light emitting diode (OLED) based graphical display. In this exemplary embodiment, the graphical display 110 may be mounted in a vehicle cabin and is operative to display a countdown timer 120, a first message 150, a second message 160 and a third message 170.

In this exemplary embodiment, the system is operative to use vehicle to everything (V2X) or vehicle to infrastructure (V2I) communications to communicate with a traffic indicator to determine when a vehicle is stopped at a red-light and the remaining duration of time until a change in the red-light state. During the red-light state, the display is operative to present a summary of important information received on a mobile device or vehicle system while driving on the graphical display 110. The graphical display 110 may be further operative to display a countdown timer 120 in response to data received via the V2X communications, such as remaining time until a change in the red-light state. The system may use machine learning to consolidate information into summarized snippets with intelligent pre-loaded response options. The machine learning may use computational models to prioritize content the driver to interact with while stopped. Machine learning may also be used to distill complex messages or events to more basic form.

Alternatively, the exemplary system may be operative to communication with proximate vehicles via a vehicle to vehicle (V2V) communications network to provide information about traffic jam situations. If the host vehicle is stopped in traffic, the message may be displayed if the predicted stop time is sufficient. A predicted stop time countdown may be displayed in order to warn a vehicle operator of the need to reengage with the driving operations.

For example, the first message 150 is generated in response to a missed call. To generate the first message 150, a voice recognition machine learning operation, or similar operation, is performed on a voice mail message to extract that a question has been asked in the voice mail message as to what time the recipient will be home. The voice recognition operation further extracts a statement that "pizza is on the way." The system is operative to generate the first message 150 for display as well as an appropriate possible response, such as "I'll be home in 15 minutes." The travel time displayed may be generated in response to a navigation system query for a trip duration between the vehicle current location and the vehicle operator's home. In addition, the system is operative to provide a button for the driver to call back the original caller. The first message 150 may further provide an option to play the message via the vehicle infotainment system.

In addition, the system may be operative to display the second message 160 and the third message 170 with lower priority than the first message 150 according to a hierarchy criterion. For example, direct messages, such as missed calls, voice mails and text messages may be displayed with a higher criterion than general information, such as sports scores, or notifications, such as a package being delivered. Information displayed on the graphical user interface may include calendar events, news updates, weather update, weather alerts, driver and/or vehicle performance indicators, such as fuel economy, phone calls, messages, emails, etc. The information display may also sourced from a connected virtual assistant such as Siri or Google Assistant, regardless of phone presence. In this example, "connected" may mean the user has linked their personal assistant cloud with their vehicle cloud accounts.

Figure 2:
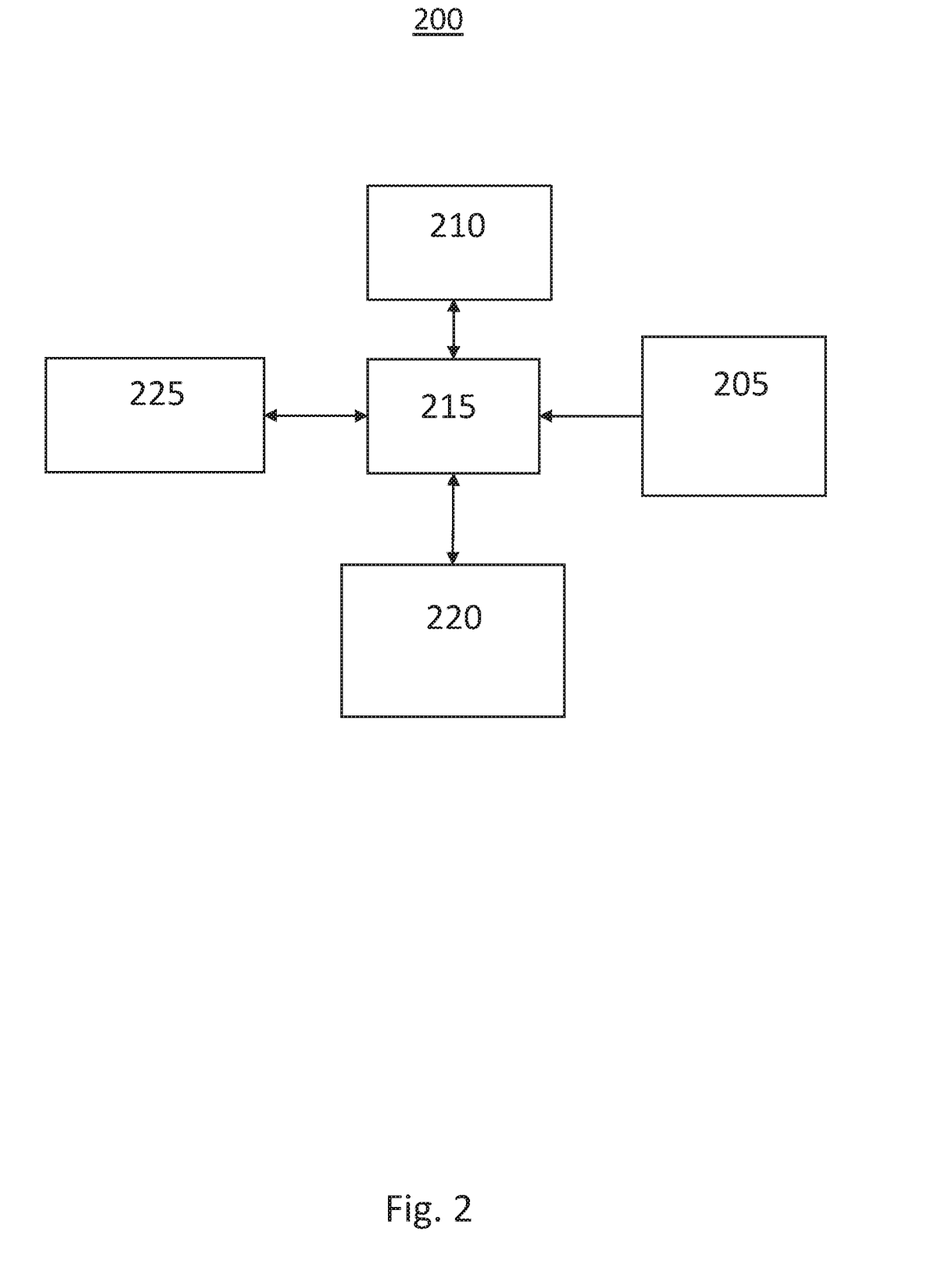
FIG. 2 shows a block diagram illustrating a system for location and calibration for controls on a user interface according to an exemplary embodiment of the present disclosure.

Turning now to FIG. 2, a block diagram of an exemplary system for location and calibration for controls on a display 200 according to an exemplary embodiment of the present disclosure is shown. The system 200 includes a display 210, a touch sensor 205, a processor 215, a transceiver 225 and a memory 220.

The display 210 is operative to display a graphical user interface for presentation to a vehicle operator and/or vehicle occupant. In this exemplary embodiment, the display 210 is operative to display messages and notifications to an operator in response to data received from the processor 215. The display 210 may be mounted in the vehicle cabin, as part of the center console or within the instrument cluster. In an exemplary embodiment the present disclosure, the display 210 is mounted within the vehicle operators' field of view while the vehicle operator is operating the vehicle, such as when seated in the driver's seat.

The touch sensor 205 is operative to receive a user input from the vehicle operator and/or a vehicle occupant. The touch sensor 205 may be integrated into the display 210, either behind the display 210 or as a transparent or semi-transparent overlay over the display 210, thereby forming a touch sensitive user interface display or the like. Alternatively, the touch sensor 205 may be composed of one or more buttons, jog wheels, switches, or the like. In this exemplary embodiment, the touch sensor 205 is operative to couple a control signal to the processor 215 indicative of the touch sensor location and/or function. The touch sensor may be operative to transmit a two-dimensional location of a touch pad indicative of a location touched by the vehicle occupant.

The touch sensor 205 may transmit a control signal to the processor 215 indicative of a selection made by an operator in response to a message transmitted from the processor 215 for display on the display 210. For example, the processor 215 may be operative to generate message for display on a graphical user interface displaying a missed call notification including information about the missed call, such as caller, voice recognized text from a message, icon representative of the caller, etc. Furthermore, the graphical user interface may present a number of options for response to the message for the operator to select, such as clear notification and/or call back. The touch sensor 205 may then be operative to transmit an indication of an option selected by the operator in response to the message, such as a location on the touch sensor 205 or as data indicative of the option selection, such as a digital control signal or the like.

The exemplary system may further include a memory 220 for storing control algorithms, graphical user interface instructions, interface information to enable communication between the other system components and the like. The memory 220 may store a contacts directory with information related to telephone numbers, etc. such as names, icons, photos, addresses, etc. The memory 220 may further store communications protocol information for V2X communications functions.

The exemplary system may further include a transceiver 225 operative to perform wireless communications via a wireless network. The transceiver 225 may be implemented as a bidirectional device with receiver and transmitter portions or may be composed of a separate receiver and transmitter. In this exemplary embodiment, the transceiver 225 may be operative to perform V2X communications with infrastructure proximate to the host vehicle, such as communications with a traffic light controller. The transceiver 225 may be operative to transmit, via a V2X communications protocol, a request to a traffic light controller requesting a remaining time for a traffic light red-light state. The transceiver 225 may be operative to receive a response from the traffic light controller indicative of the time remaining. The transceiver 225 may then couple this time remaining indicator to the processor 215. Alternatively, the traffic light controller may be operative to periodically transmit a beacon signal indicative of the traffic light state and the length of time remaining for the current traffic light state. The transceiver 225 may detect the beacon, receive the traffic light state and remaining time, and couple this information to the processor 215.

The transceiver 225 may be further operative to communicate to a mobile device, such as a cellular telephone, smartphone, computer, or other similar device via a short range communications protocol, such as Bluetooth or the like. The transceiver 225 may be operative to receive notifications from a mobile device, such as text messages, may be able to transmit and receive a two-way voice call data and the like. In an alternative exemplary embodiment, separate transceivers may be used for V2X communications and for communications to a mobile device, such as a Bluetooth transceiver and a V2X or V2I communications transceiver for communications to a traffic light controller.

The processor 215 is operative to receive data from the transceiver 225, the touch sensor 205 and the memory 220 and to generate a graphical user interface for presentation on the display 210. The processor 215 may be in communications with a portable mobile device, such as a cellular phone, through a wireless connection via the transceiver 225 and operative to receive messages, data, and other information from the mobile device. The processor 215 may be operative to generate or alter portions of the graphical user interface in response to these communications. In addition or alternatively, the processor 215 may be operative to receive data and/or notifications from a service provider, such as OnStar, via the transceiver, or vehicle information from a vehicle controller or the like, indicative of an operating condition of the vehicle. The processor 215 may be further operative to generate or alter portions of the graphical user interface in response to these communications. In an exemplary embodiment of the present disclosure, the processor 215 may be operative to receive data from a mobile device, generate a graphical user interface in response to this data indicative of information immediately relevant to a vehicle operator, and to store this information in the memory 220. The processor 215 is then operative to wait to transmit the information for presentation on the display 210 until it is safe to do so.

The processor 215 may be further operative to receive an indication that the vehicle is about to come to a stop. This information may be received from a vehicle controller, a brake pedal switch, an inertial measurement unit (IMU), a navigation system or the like. Alternatively, the processor 215 may receive data from a proximate traffic light controller via the transceiver 225 indicative of a current or upcoming stop indication. This data from the traffic light controller may be indicative of a length of time remaining for the stop indication. In the exemplary embodiment, the processor 215 is operative to receive an indication that the vehicle is about to stop for a duration of time, such as a received indicator from a traffic light controller. The processor 215 may then be operative to generate a graphical user interface including notifications, messages, and information stored in the memory, as well as a duration indicator of the time remaining for the traffic light state. In response to an indication that the vehicle has stopped, such as information from an IMU, vehicle controller or the like, the processor 215 may then be operative to couple the graphical user interface to the display 210 for presentation to the vehicle operator. When the state condition of the traffic light changes, or the vehicle resumes motion, the processor 215 may be further operate to cease coupling the user interface to the display 210 such that the information is no longer displayed to the vehicle operator.

During presentation of the graphical user interface on the display 210 to the operator, the processor 215 may be further operative to receive data from the touch sensor 205 indicative of an operator response to a notification displayed on the graphical user interface. The processor 215 may then be operative to perform the function associated with the operator response, couple the operator response to a secondary device, such as a mobile device, and/or alter the graphical user interface if required. For example, the operator response may be indicative of a call back command to a missed call notification displayed on the graphical user interface. The processor 215 would then be operative to initiate a return voice call via a connected mobile phone device or onboard communications device to the number associated with the missed call.

Figure 3:
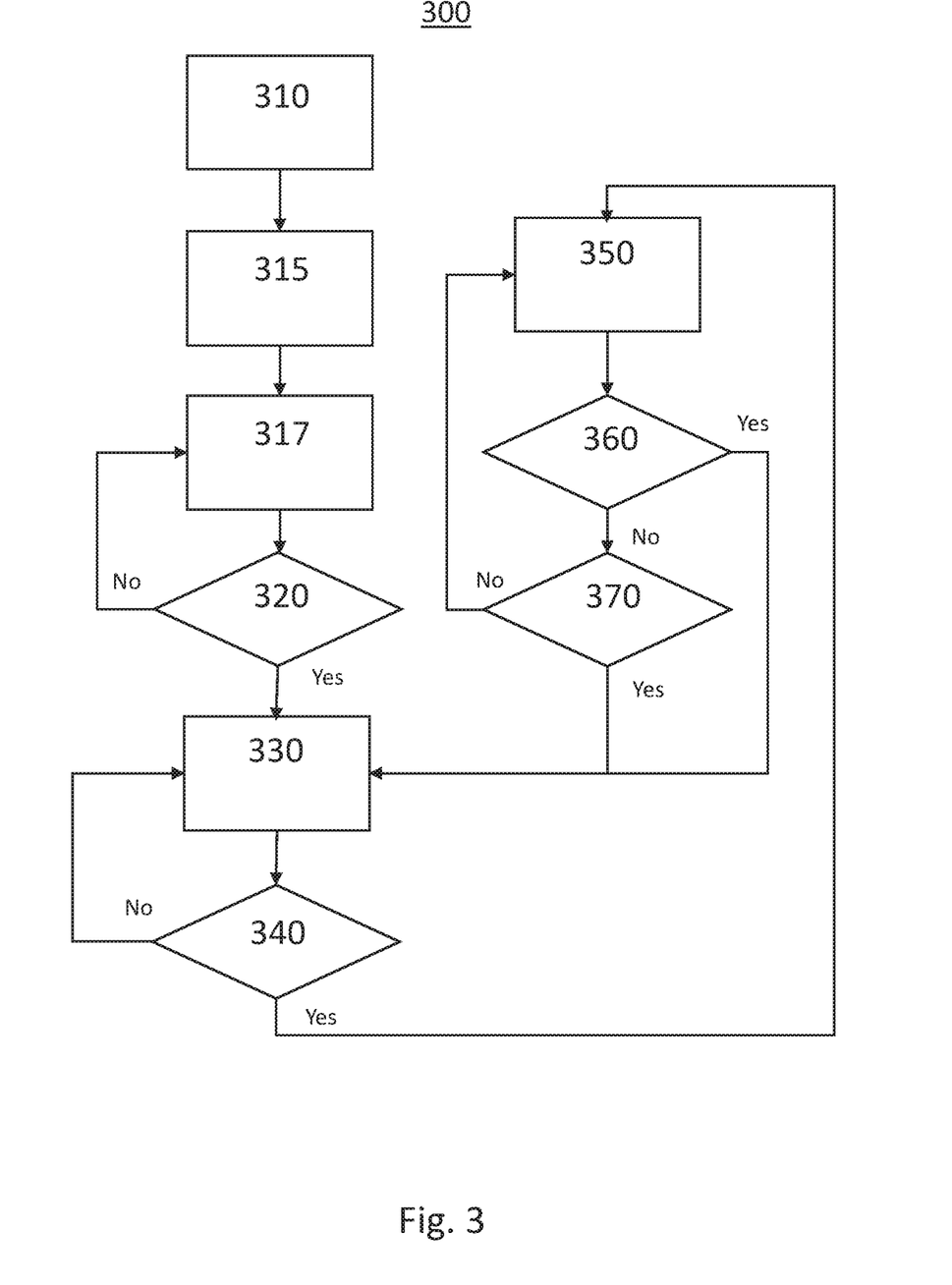
FIG. 3 shows a flow chart illustrating a method for location and calibration for controls on a user interface according to an exemplary embodiment of the present disclosure.

Turning now to FIG. 3, a flow chart illustrating an exemplary method for location and calibration for controls on a display 300 according to an exemplary embodiment of the present disclosure is shown. In this exemplary embodiment the method is first initiated 310 in response to a commencement of vehicle operation. Exemplary indications of a vehicle operation commencement may be detected in response to a combustion engine starting, an ignition switch rotated to an on position, a signal from a vehicle controller, and/or a transmission being shifted into the drive position.

In response to the initiation of vehicle operation, the method may be operative to establish a connection 315 between the vehicle system and a mobile device, such as smart phone, which may receive messages, notifications, or telephone calls of interest to the vehicle operator. The connection may be made via a wireless connection, such as a Bluetooth connection, or may be made via a wired connection, such as through a universal serial bus (USB) cable. In an exemplary embodiment, during a time between vehicle systems initiation and vehicle movement, a graphical use interface may be presented 317 to a vehicle operator on a display in the vehicle cabin where notifications and messages may be immediately presented to the vehicle operator when received from the mobile device or a vehicle system.

The method is next operative 320 to detect an indication of vehicle movement. The vehicle movement may be determined in response to an indication from an IMU, vehicle controller, or in response to a global positioning system (GPS) output. In response to detected vehicle movement, messages received by from the mobile device, remote service provider or other vehicle systems, may not be displayed on the graphical user interface. Alternatively, the graphical use interface may be updated with received messages and notifications during vehicle movement but may not be presented on the display during movement.

In an exemplary embodiment, the method may next be able to store 330 received messages and notifications on a memory while the vehicle is in motion. In addition, the method may be operative to perform machine learning operations on the messages to generate a digest of the messages, to generate summaries or extract important excerpts from voice messages, and to generate a prioritization of messages for the graphical user interface. The results of the machine learning operations may be stored in a memory for subsequent presentation on a display to a vehicle operator or may be integrated into a graphical user interface for subsequent display to a vehicle operator.

The method may next be operative to receive 340 an indication of an upcoming vehicle stop. This indication may be received from a vehicle controller, indicative of a reduction in speed and/or depression of a vehicle brake pedal. Alternatively, the indication of the stop may be received in response to a V2X communication. In an exemplary embodiment, the method is operative to receive an indication via a wireless network from a traffic light controller indicating a red-light traffic light state. The data from the traffic light controller may include current traffic light state, time duration of the current traffic light state, subsequent traffic light state, time duration of subsequent traffic light state, etc.

In response to a vehicle stop, the method may next be operative to present 350 the graphical user interface on the vehicle cabin display. Presenting the graphical user interface may include enabling the display, generating the display for presentation, coupling the generated graphical user interface from the processor to the display or the like. In an exemplary embodiment, the updated graphical user interface may include a digest of messages, notifications, and missed calls received from a mobile device or a vehicle system while the vehicle was in motion. The digest may be presented as a prioritized list of messages, prioritized in response to a user preference, a default preference list, or a prioritization determined in response to an operator's history of actions. For example, if a vehicle operator frequency selects sports scores when stopped, sports scores may be given a higher priority in listing that notifications that are not frequency selected by an operator. If stopped at a traffic light, the method may further be operative to display the time remaining the current traffic light state. For example, the graphical user interface may be operative to display a graphical representation of the traffic light state, such as a red-light, and a countdown timer indicative of the time remaining in the current red-light state. In addition, the method may be operative to delay the presentation of the graphical user interface until the vehicle has been stopped for a duration of time, such as one second or the like.

If vehicle movement is detected 360, the method may be operative to cease presentation of the graphical user interface on the display and return to storing the received messages 330. If vehicle movement is not detected, the method may then be operative to determine if 370 the countdown timer has expired, indicating a change in the traffic light state. If the countdown time has not expired, the method continues to present the GUI to the vehicle operator 350. If the countdown timer has expired 370, the method may be operative to cease presentation of the graphical user interface on the display and return to storing the received messages 330. Alternatively, if the countdown has expired, the method may be operative to wait for an initiation of vehicle movement before ceasing presentation of the GUI to the operator. The method may be operative to display a warning or notification on the GUI that the traffic light state has changed.

Figure 4:
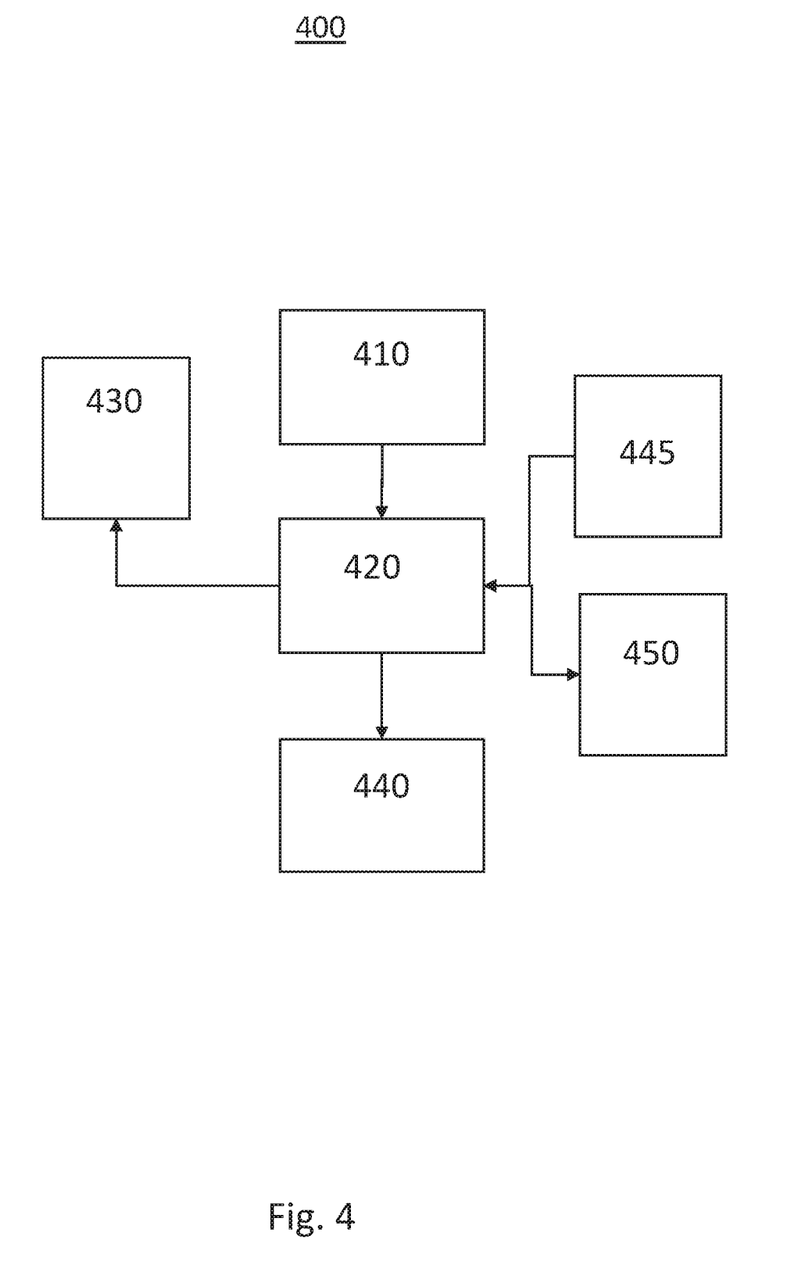
FIG. 4 shows a block diagram illustrating a system for location and calibration for controls on a user interface according to another exemplary embodiment of the present disclosure.

Turning now to FIG. 4, a block diagram of a system for location and calibration for controls on a display 400 according to an exemplary embodiment of the present disclosure is shown. The exemplary system includes a vehicle controller, a receiver, a display and a processor.

In this embodiment of the exemplary system 400 having a vehicle controller 410 is operative to provide an indication of a vehicle a being stationary and an indication of the vehicle being in motion. The vehicle controller 410 may be further operative to generate user notifications concerning vehicle operation, such as low fuel warning, vehicle speed indicator, brake pedal application indicator, and the like.

The system 400 further includes a receiver 430 operative to receive a communication indicative of a red-light traffic light state and a time indication of a time remaining in the red-light traffic light state. The communications may be received via a wireless network, such as a vehicle to infrastructure communications network, wherein the communications may be transmitted by a traffic light controller. The receiver may be further operative to receive a message from a wireless device, such as a mobile phone.

The system 400 may further include a processor 420 operative to receive the communications indicative of the red-light traffic state and the time indication of the time remaining in the red-light traffic state. The processor 420 being further operative to generate a graphical user interface, wherein the graphical user interface includes the notification from the vehicle controller and a time remaining in the red-light traffic state. Alternatively, the notification may be received via the receiver 430 from a mobile device, and the notification may be a message received from the mobile device. The notification may be received via an input for receiving the notification from a mobile device, such as a USB input.

The exemplary system 400 may further include a display 440 for displaying the graphical user interface in response to the indication of the vehicle being stationary and the time remaining in the red-light traffic state being greater than zero seconds, wherein the display 440 is further operate to cease displaying the graphical user interface in response to at least one of the indication of the vehicle being in motion and the time remaining in the red-light traffic state being less than zero seconds. A memory 445 may be used to store the graphical user interface and/or the notification while the system is operative to cease displaying the graphical user interface. The memory 445 may be operative to memory for storing a notification in response to at least one of the indications of the vehicle being in motion and the time remaining in the red-light traffic state being less than zero seconds. The exemplary system 400 may further include a user input 450 wherein the user input is operative to receive a user response to the notification. The user input may be part of a touch sensitive display for receiving the user response to the notification.

Figure 5:
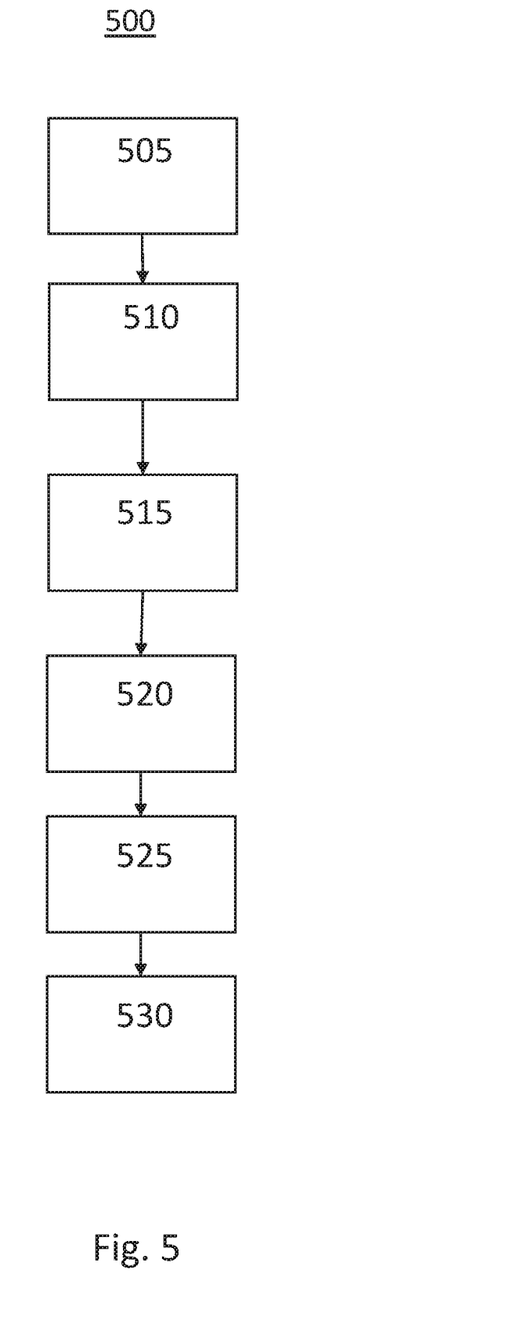
FIG. 5 shows a flow chart illustrating a method for location and calibration for controls on a user interface according to another exemplary embodiment of the present disclosure.

Turning now to FIG. 5, a flow chart illustrating another exemplary method for location and calibration for controls on a display 500 according to an exemplary embodiment of the present disclosure is shown.

A method is first operative to establish 505 a connection to a mobile device. According to an exemplary embodiment, the connection to the mobile device may be a wireless connection. Alternatively, the connection to the mobile device may be a non-wireless connection, such as a USB connection or the like.

The method is next operative to receive 510 a notification from the mobile device. The notification may be indicative of a missed call and wherein the notification is further indicative of a telephone number associated with the missed call The method may then receive 515 an indication of a red-light state and a time remaining of the red-light state via a wireless communication. The indication of the red-light state and the time remaining of the red-light state may be received from a traffic light controller via a vehicle to infrastructure communications network. Next, the method is operative for detecting 520 a stationary vehicle condition from a vehicle controller; IMU, GPS or the like.

According to this exemplary embodiment, the method is operative for displaying 525 the notification, the indication of the red-light state and the time remaining of the red-light state to a vehicle operator on a video display in response to the stationary vehicle condition. In an additional exemplary embodiment, the video display may be further operative to generate a prioritized list of a notification from the mobile device and a message from the vehicle controller. In an additional exemplary embodiment, the method may be operative to display a suggested response to the notification and a user input for selecting the suggested response. The method may be operative to receive a user input indicative of a response to the notification and to initiate a telephone call in response to the user input and a telephone number associated with the notification. The method may be further operative for receiving an indicator from the vehicle controller and a weather alert and generating a prioritized list in response to the notification, weather alert, and the indicator and displaying the prioritized list in response to the stationary vehicle condition.

Finally, the method may discontinue 530 display of the notification in response to at least one of an indication of a vehicle movement from a vehicle controller and the time remaining of the red-light state being zero seconds. The method may be operative to store the notification in a memory in response to discontinuing display of the notification.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. An apparatus comprising:
a vehicle controller for providing an indication of a vehicle a being stationary and an indication of the vehicle being in motion;
a receiver operative to receive a communication indicative of a red-light traffic light state and a time indication of a time remaining in the red-light traffic light state;
a processor operative to generate a graphical user interface, wherein the graphical user interface includes a notification and a time remaining in the red-light traffic state; and
a display for displaying the graphical user interface in response to the indication of the vehicle being stationary and the time remaining in the red-light traffic state being greater than zero seconds, wherein the display is further operate to cease displaying the graphical user interface in response to at least one of the indication of the vehicle being in motion and the time remaining in the red-light traffic state being less than zero seconds.

2. The apparatus of claim 1 further including an input for receiving the notification from a mobile device.

3. The apparatus of claim 1 wherein the notification is received from the vehicle controller.

4. The apparatus of claim 1 wherein the receiver is a vehicle to infrastructure communications device.

5. The apparatus of claim 1 further including a user input wherein the user input is operative to receive a user response to the notification.

6. The apparatus of claim 1 wherein the display is a touch sensitive display and is further operative to receive a user response to the notification.

7. The apparatus of claim 1 wherein the communication indicative of the red-light state is received from a traffic signal controller via a vehicle to infrastructure communications network.

8. The apparatus of claim 1 further including a memory for storing the notification in response to at least one of the indication of the vehicle being in motion and the time remaining in the red-light traffic state being less than zero seconds.

9. A method comprising:
establishing a connection to a mobile device;
receiving a notification from the mobile device;
receiving an indication of a red-light state and a time remaining of the red-light state via a wireless communication;
detecting a stationary vehicle condition from a vehicle controller;
displaying the notification, the indication of the red-light state and the time remaining of the red-light state to a vehicle operator on a video display in response to the stationary vehicle condition; and
discontinuing display of the notification in response to at least one of an indication of a vehicle movement from a vehicle controller and the time remaining of the red-light state being zero seconds.

10. The method of claim 9 wherein the connection to the mobile device is a wireless connection.

11. The method of claim 9 wherein the indication of the red-light state and the time remaining of the red-light state are received from a traffic light controller via a vehicle to infrastructure communications network.

12. The method of claim 9 wherein the display is further operative to generate a prioritized list of a notification from the mobile device and a message from the vehicle controller.

13. The method of claim 9 wherein the notification is indicative of a missed call and wherein the notification is further indicative of a telephone number associated with the missed call.

14. The method of claim 9 further operative to receive a user input indicative of a response to the notification and to initiate a telephone call in response to the user input and a telephone number associated with the notification.

15. The method of claim 9 further including display a suggested response to the notification and a user input for selecting the suggested response.

16. The method of claim 9 storing the notification in a memory in response to discontinuing display of the notification.

17. The method of claim 9 further including receiving an indicator from the vehicle controller and a weather alert and generating a prioritized list in response to the notification, weather alert, and the indicator and displaying the prioritized list in response to the stationary vehicle condition.

18. A vehicle operator notification system comprising:
a first receiver operative to receive a first notification and a second notification;
a second receiver to receive a traffic light state and a traffic light state duration;
a processor operative to generate a prioritized digest of the first notification and the second notification, the processor being further operative to couple the prioritized digest to a display in response to the traffic light state being red and the traffic light state duration being greater than zero seconds; and
a display operative to display the prioritized digest to a vehicle operator.

19. The vehicle operator notification system of claim 18 wherein the first notification and the second notification are received from a mobile device via a wireless network.

20. The vehicle operator notification system of claim 18 wherein the traffic light state and the traffic light state duration are received via a vehicle to infrastructure communications network.

* * * * *